US006792513B2

United States Patent
Bade et al.

(10) Patent No.: US 6,792,513 B2
(45) Date of Patent: Sep. 14, 2004

(54) SYSTEM, METHOD, AND COMPUTER PROGRAM PRODUCT FOR HIGH SPEED BACKPLANE MESSAGING

(75) Inventors: Paul R. Bade, Ellicott City, MD (US); Steven A. Kahn, Rockville, MD (US); David M. Verven, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 284 days.

(21) Appl. No.: 10/110,572

(22) PCT Filed: Dec. 28, 2000

(86) PCT No.: PCT/US00/35455

§ 371 (c)(1),
(2), (4) Date: Apr. 12, 2002

(87) PCT Pub. No.: WO01/48620

PCT Pub. Date: Jul. 5, 2001

(65) Prior Publication Data

US 2003/0093492 A1 May 15, 2003

Related U.S. Application Data

(60) Provisional application No. 60/173,459, filed on Dec. 29, 1999.

(51) Int. Cl.$^7$ .......................... G06F 12/00; G06F 12/14; G06F 13/00; G06F 13/28; G06F 15/167
(52) U.S. Cl. .......................... 711/147; 711/150; 710/22; 710/308; 709/212; 709/214; 709/215
(58) Field of Search .............................. 710/22–24, 26, 710/308; 709/212, 214, 215; 700/2, 3; 711/147, 148, 150

(56) References Cited

U.S. PATENT DOCUMENTS 4,449,182 A    5/1984  Rubinson et al.

(List continued on next page.)

FOREIGN PATENT DOCUMENTS

| EP | 0646876 A1 | 10/1994 |
| EP | 0899657 A2 | 7/1998 |
| WO | WO 91/11768 | 8/1991 |

*Primary Examiner*—Jeffrey Gaffin
*Assistant Examiner*—Tanh Q Nguyen
(74) *Attorney, Agent, or Firm*—Francis A. Cooch (57) ABSTRACT

A system/method of enhanced backplane messaging among a plurality of computer boards communicating over a common bus uses a set of pre-allocated buffers on each computer board to receive messages from other computer boards. Each sending computer board is represented on each remote computer board by a descriptor ring with pointers to pre-allocated buffers on that remote computer board. When a sending computer board has a message to deliver to a remote computer board, the sending computer board uses its DMA controller to transfer the message into the pre-allocated buffers on the remote computer board. The sending computer board also sends a mailbox interrupt to the remote computer board. The remote computer board interrupt handler searches its descriptor rings and manipulates a series of pointers to move messages from the descriptor rings to the intended receiving application(s). Pointer manipulation is also used to replenish the descriptor ring(s) with empty buffer(s).

24 Claims, 8 Drawing Sheets

U.S. PATENT DOCUMENTS

| | | | |
|---|---|---|---|
| 4,479,179 A | | 10/1984 | Dinwiddie, Jr. |
| 4,481,578 A | | 11/1984 | Hughes et al. |
| 4,876,664 A | | 10/1989 | Bittorf et al. |
| 5,072,374 A | * | 12/1991 | Sexton et al. ............... 709/208 |
| 5,099,449 A | * | 3/1992 | Dombrosky et al. .......... 710/58 |
| 5,170,466 A | | 12/1992 | Rogan et al. |
| 5,182,808 A | | 1/1993 | Bagnoli et al. |
| 5,253,347 A | | 10/1993 | Bagnoli et al. |
| 5,301,350 A | | 4/1994 | Rogan et al. |
| 5,321,816 A | | 6/1994 | Rogan et al. |
| 5,329,630 A | | 7/1994 | Baldwin |
| 5,442,797 A | | 8/1995 | Casavant et al. |
| 5,475,818 A | | 12/1995 | Molyneaux |
| 5,485,624 A | * | 1/1996 | Steinmetz et al. ............ 712/34 |
| 5,488,733 A | | 1/1996 | Molyneaux |
| 5,581,713 A | | 12/1996 | Myers et al. |
| 5,584,010 A | * | 12/1996 | Kawai et al. ............... 711/117 |
| 5,592,622 A | | 1/1997 | Isfeld et al. |
| 5,592,625 A | * | 1/1997 | Sandberg .................... 711/147 |
| 5,634,099 A | | 5/1997 | Andrews et al. |
| 5,787,095 A | | 7/1998 | Myers et al. |
| 5,835,779 A | * | 11/1998 | Chang et al. ............... 710/268 |
| 5,887,146 A | | 3/1999 | Baxter et al. |
| 6,148,349 A | * | 11/2000 | Chow et al. .................. 710/33 |

* cited by examiner

SYSTEM, METHOD, AND COMPUTER PROGRAM PRODUCT FOR HIGH SPEED BACKPLANE MESSAGING

CROSS-REFERENCE TO RELATED APPLICATIONS

This application claims the benefit of International Application No. PCT/US00/35455, filed Dec. 28, 2000 which claims the benefit of prior filed co-pending U.S. Provisional Patent Application NO. 60/173,459, filed on Dec. 29, 1999.

STATEMENT OF GOVERNMENTAL INTEREST

This invention was made with Government support under Contract No. N00024-98-D-8124 awarded by the Department of the Navy. The Government has certain rights in the invention.

FIELD OF THE INVENTION

The present invention relates generally to a system and method for exchanging messages among a plurality of computer boards connected via a bus on a common backplane.

BACKGROUND OF THE INVENTION

Conventional backplane messaging schemes for exchanging messages among processors within a network utilizing a shared memory interconnect (bus) require a processor that wants to send a message (data packet) using the bus to request an empty buffer from the remote computer board processor, then transfer the data packet, and finally to notify the remote computer board processor of the arrival of the data packet. The overhead involved in this form of handshake for buffer allocation/de-allocation can significantly affect network performance.

SUMMARY OF THE INVENTION

A system and method of enhanced backplane messaging among a plurality of computer boards communicating over a common bus uses a set of pre-allocated buffers on each computer board to receive messages from other computer boards. Each sending computer board is represented on each remote computer board by a descriptor ring with pointers to pre-allocated buffers on that remote computer board. When a sending computer board has a message to deliver to a remote computer board, the sending computer board uses its DMA controller to transfer the message into the pre-allocated buffers on the remote computer board. The sending computer board also sends a mailbox interrupt to the remote computer board. The remote computer board interrupt handler searches its descriptor rings and manipulates a series of pointers to move messages from the descriptor rings to the intended receiving application(s). Pointer manipulation is also used to replenish the descriptor ring(s) with empty buffer(s). As a practical matter, pointer manipulation eliminates repeated copying of a message. Moreover, the use of pre-allocated buffers on each remote computer board achieves a significant performance boost over the more conventional technique of buffer request and assignment.

In addition, chained DMA transfers are used to eliminate any data transfers by a computer board processor (CPU) across the bus. The chained DMA transfers transfer messages to the pre-allocated buffers, set flags indicating that a message is present in a buffer, send a mailbox interrupt to the remote computer board, and read back the address of the next pre-allocated buffer for that descriptor ring.

Other aspects and features of the present invention will become apparent to those ordinarily skilled in the art upon review of the following description of specific embodiments of the invention in conjunction with the accompanying figures.

DETAILED DISCLOSURE OF THE INVENTION

Figure 1:
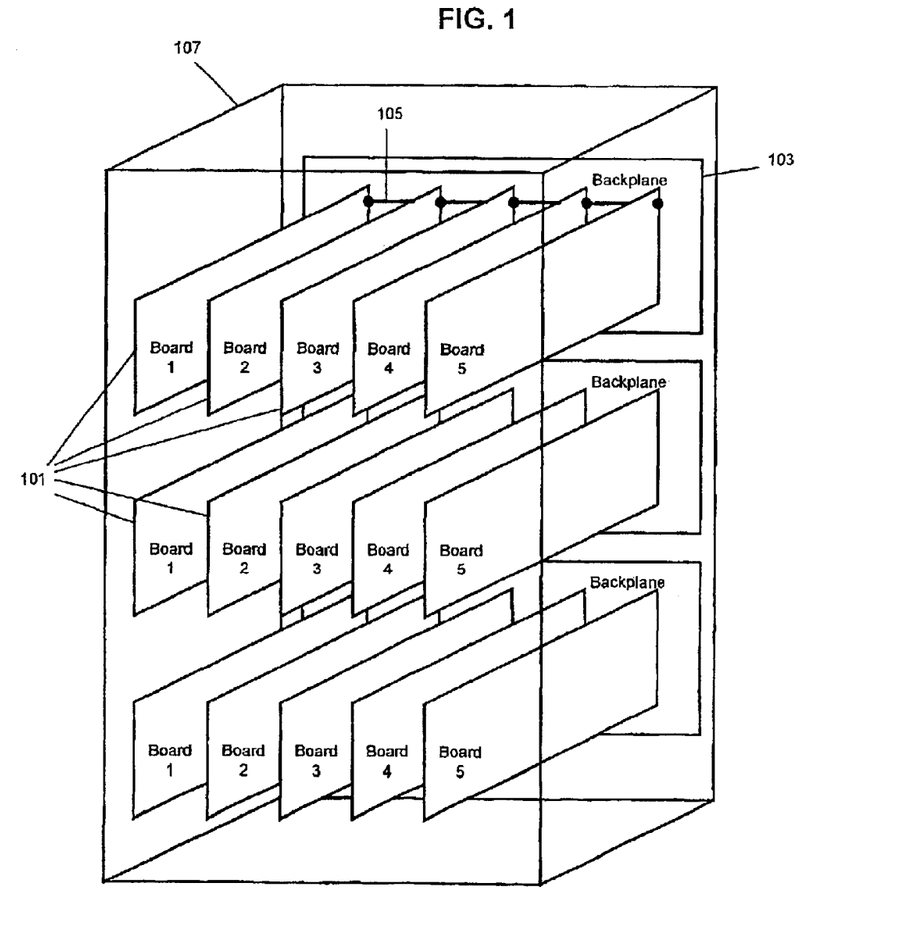
FIG. 1 is a physical representation of the context and environment of the messaging scheme of the present invention.

FIG. 1 is a physical representation of the context and environment of the messaging scheme of the present invention. The purpose of the present invention is to provide a system and method for exchanging messages among a plurality of computer boards connected via a backplane bus. The terms backplane and bus may be used interchangeably throughout this description to refer to the means that connect the various computer boards. The term message refers to data or data packets that can be grouped together. Thus, the phrase messaging scheme generally refers to a scheme for sending and receiving data across a common bus or backplane. FIG. 1 illustrates a cabinet 107 having three racks. A rack is a combination of a set of computer boards 101 connected to a common backplane 103. A bus 105 connects a set of computer boards 101 such that messages can be exchanged among the computer boards 101 connected to such a bus 105.

Figure 2:
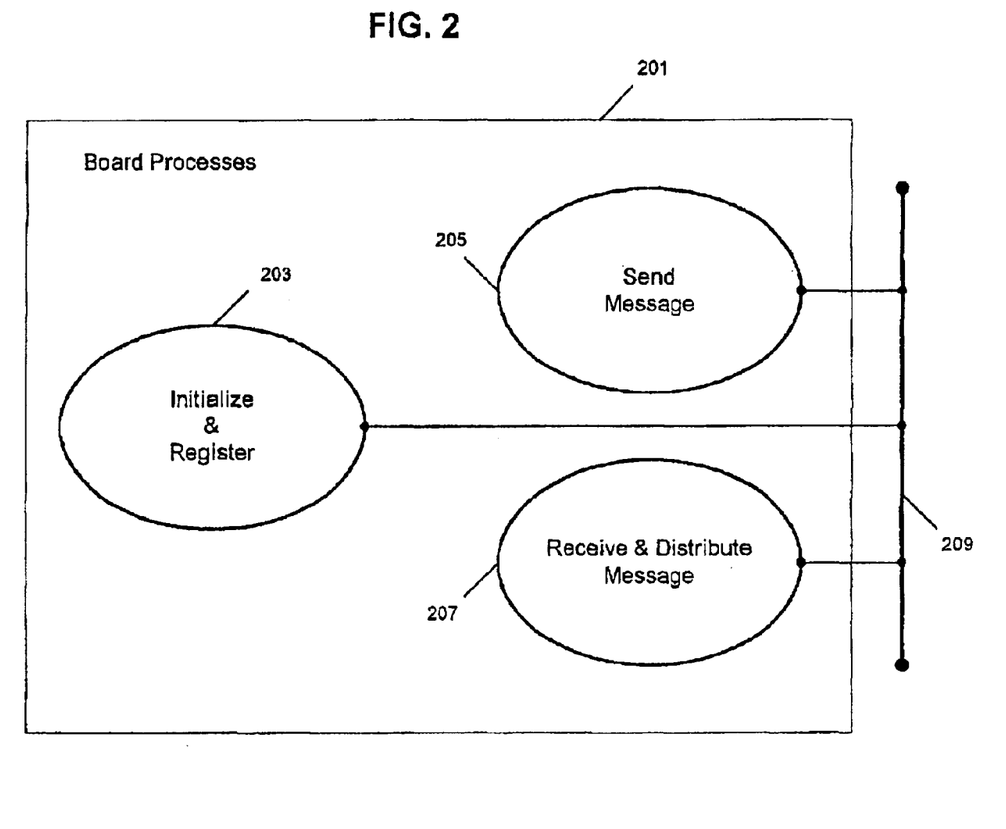
FIG. 2 illustrates an individual computer board and the high level processes or functions running on the computer board with respect to the messaging scheme of the present invention.

FIG. 2 illustrates an individual computer board 201 and the high level processes or functions running on the computer board with respect to the messaging scheme of the present invention. It is to be understood that each computer board likely has other processes and functions running. Only the processes and functions relevant to the present invention are shown, however. There are three processes or functions that comprise the messaging scheme of the present invention. The first is an initialization and registration process 203. The initialization and registration process 203 performs preliminary tasks necessary to prepare the computer board 201 for message exchanging with other computer boards. Another process is the send process 205 that is responsible for sending messages to other computer boards that are connected to the common backplane. The messages are obtained from application output queues residing on the computer board. The other process is a receive process 207 that is responsible for receiving messages from other computer boards that are connected to the common backplane and distributing the messages to intended application(s) on the local computer board. A bus 209 is shown to illustrate that each process has access to the bus in order to be able to send or receive data.

Figure 3:
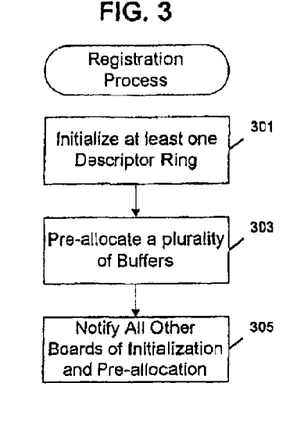
FIG. 3 is a high level flow diagram for the initialization and registration process.

FIG. 3 illustrates a registration process. There are two primary tasks with respect to initializing a computer board to be able to exchange messages with other computer boards. One task is to initialize at least one descriptor ring 301 on the computer board. Descriptor rings are used to receive messages from other computer boards. The other task is to pre-allocate a plurality of buffers 303. The buffers will be used to store incoming messages. Pre-allocation of the buffers is a significant part of the messaging scheme of the present invention in order to provide a known destination for a message transfer as opposed to requiring the sender to request a new buffer prior to each message transfer. Once the descriptor rings have been initialized and buffers have been pre-allocated, the computer board completes the registration process by notifying all other computer boards 305 connected to the backplane that it has initialized its descriptor rings and pre-allocated buffers.

Those of ordinary skill in the art can readily devise and implement alternate registration and initialization processes without departing from the spirit or scope of the present invention. Thus, any initialization and registration processes described herein are illustrative and not intended to limit the core sending and receiving techniques presented in this application.

Figure 4:
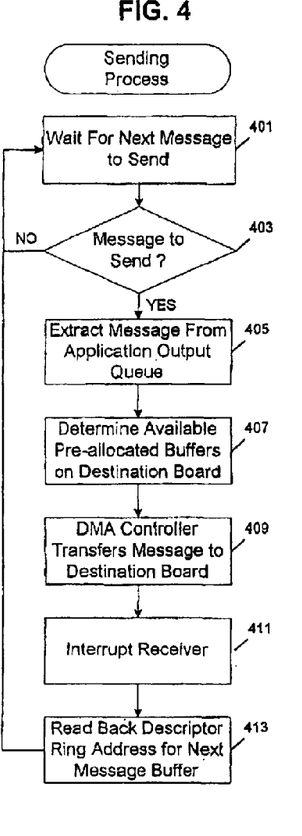
FIG. 4 is a high level flow diagram for the sending process.

FIG. 4 illustrates the sending process generally. A send task is continually in a wait state waiting for the next message it is to send 401. When a message to send is present 403 the send task extracts the message from an output queue of an on-board application 405. The send task next determines the availability of pre-allocated buffers on a remote computer board in which the receiving application resides 407. The buffer availability information is typically gathered by the DMA chain at the end of the last data transfer to the receiving computer board. Next, the send task instructs the DMA controller on the sending computer board to transfer the message to the remote computer board 409, interrupt the receiving computer board with a mailbox interrupt 411, and gather information of the availability of message buffers for the next transfer, i.e. read back the descriptor for the next message buffer 413. The DMA is, in effect, a message passing co-processor that relieves the sending computer board CPU from having to perform any transfers over the bus. If the CPU were to perform transfers, it could block while waiting for access to a busy bus. Thus, DMA chaining is utilized to enhance the speed and efficiency of the present invention messaging scheme.

Figure 5:
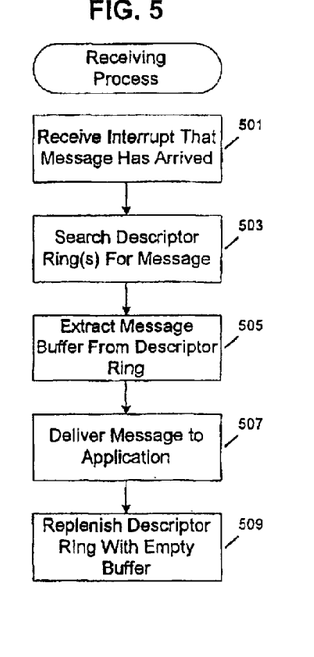
FIG. 5 is a high level flow diagram for the receiving process.

FIG. 5 illustrates the receiving process generally. An interrupt occurs notifying the receive process on the receiving computer board that a message is present 501 in one of the receiving computer board descriptor rings. The receive process searches among the descriptor ring(s) on the receiving computer board for a full message buffer 503. Once the descriptor ring containing the pointer to the message buffer is found, the receive process extracts the message buffer 505 from the descriptor ring and delivers the message 507 to the intended application using well known pointer manipulation techniques. After delivery, the receive process replenishes the descriptor ring 509 with an empty buffer.

Figure 6:
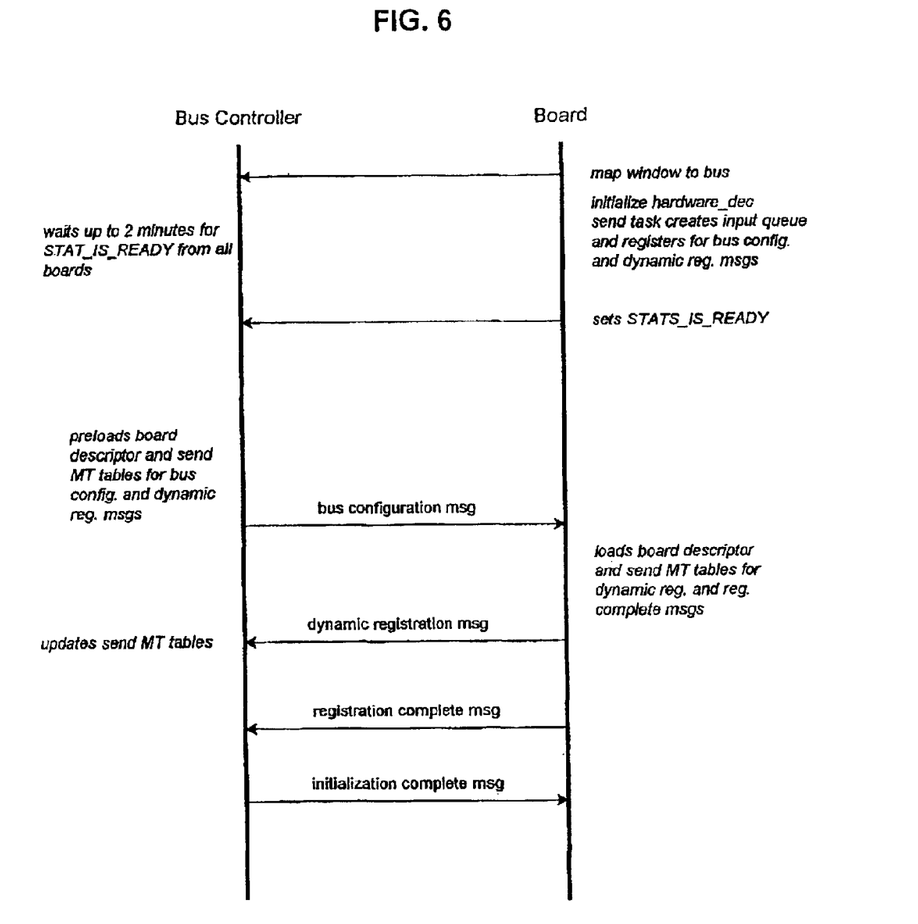
FIG. 6 is a more detailed message diagram for the initialization and registration process.

FIG. 6 is a more detailed message diagram for the initialization and registration process of each computer board that is connected to a common bus on a backplane. The process is described with respect to executing across a VMEbus. One of ordinary skill in the art can readily apply the concepts and principles of the following description and apply same to other buses. Thus, the present invention is not to be construed as limited to a VMEbus implementation.

As a computer board powers up it maps an area of its memory to a window on the VMEbus. At some point following power up, a bus controller probes the bus for computer boards that are connected to the bus. The bus controller then constructs its own bus configuration table as a result of its probing the bus for computer boards.

Meanwhile, each computer board initializes its own hardware description block and its plurality of receive descriptor rings. The computer board then instructs its send task to create a virtual message queue that is registered to receive bus configuration and dynamic registration messages from the bus controller. Each computer board concludes initialization by setting a flag to notify the bus controller that the computer board is fully initialized.

The bus controller waits for a period of time for all of the computer boards present on the bus to perform the initialization process. Next, the bus controller pre-loads its computer board descriptor table with the board descriptors corresponding to all of the computer boards. The bus controller also pre-loads the send MT table used for sending the bus configuration and dynamic registration messages to all of the computer boards. At this point, the bus controller issues the bus configuration message to all the computer boards.

When each computer board receives the bus configuration message, it builds its own board descriptor table by reading the configuration information available on each computer board. Information in a board descriptor table is used to access a unique receive descriptor ring on a remote computer board when sending message(s) to a remote computer board.

Whenever the bus controller (or any computer board) receives a dynamic registration message, it updates its send MT table with the messages registered for by the computer board that sent the dynamic registration message. The send task on each computer board is responsible for receiving the dynamic registration message(s) and updating the send MT table. Once the bus controller has collected all of the registration complete messages from each computer board, it sends an initialization complete message to all computer boards to complete the entire system initialization process. Thus, the bus controller has several responsibilities including probing the VMEbus for computer boards, sending bus configuration messages, and sending the initialization complete message.

Figure 7:
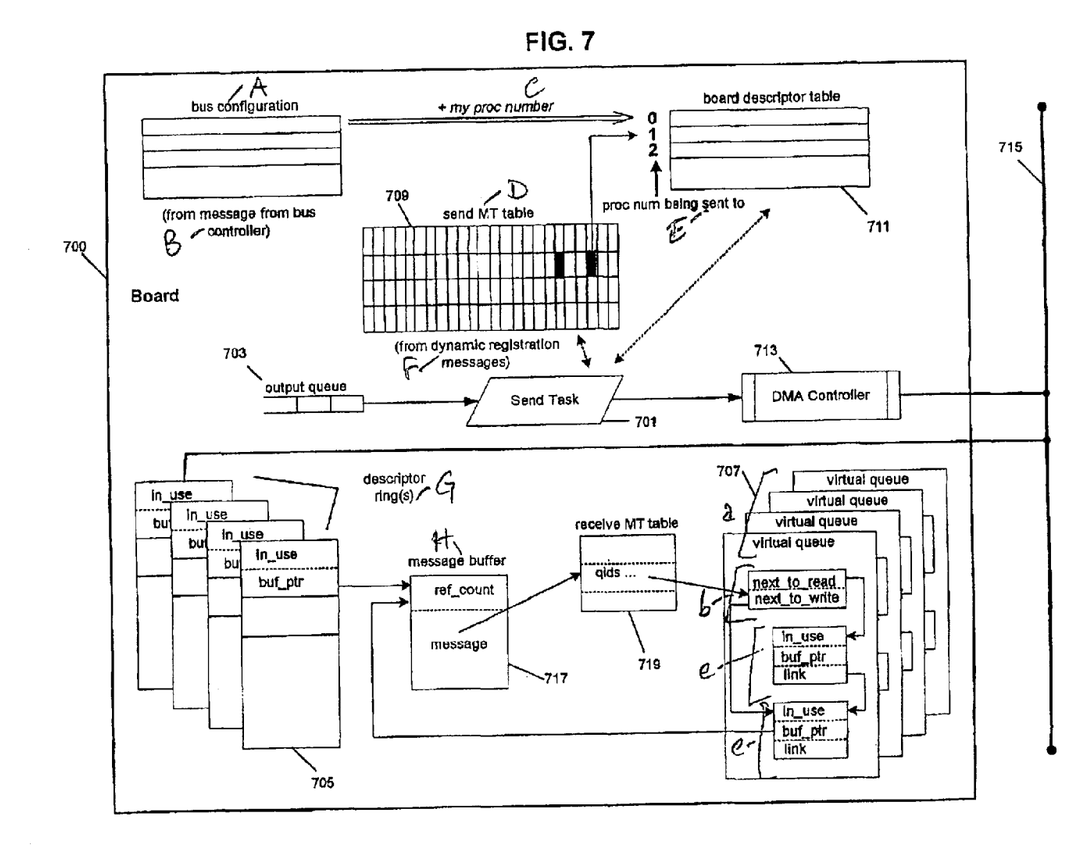
FIG. 7 illustrates a more detailed schematic of the send and receive processes as they reside on a computer board.

FIG. 7 illustrates a more detailed schematic of the send and receive hardware, software, and processes as they reside on a computer board. For ease of illustration, FIG. 7 shows a single computer board 700 which includes the sending and receiving components. Each computer board is identical with respect to the message exchanging scheme of the present invention. Thus, reference to FIG. 7 with respect to sending a message from one computer board to another computer board is appropriate since the receiving portion of the computer board shown in FIG. 7 can be thought of as existing on another computer board connected via the bus.

The sending process is managed by a send task 701. The send task is communicable with an output queue 703 into which an application places messages to be delivered to an application on a remote computer board. The receiving process includes an array of receive descriptor rings 705 (one ring per sender) to buffer incoming messages and any number of virtual input queues 707 from which applications retrieve their messages. From a receiving application's point of view the virtual input queues 707 support the publish/subscribe messaging model. Thus, an application can register for any number of message labels without having to know any information about the sender and an application can block on a queue while awaiting arrival of a message.

Tracking a message as it travels from a source to its destination provides a more detailed understanding of board-to-board message transfers. Each computer board includes a send task 701 which extracts messages from the application's output queue (or queues). The send task doesn't actually copy the message. Rather, it peeks at the message type, and then indexes into a send MT (message type) table 709 to determine the destination of the message. Each row of the send MT table 709 table can be viewed as a bit array, where each bit that is set corresponds to the processor number of each remote computer board that has one or more virtual input queues 707 registered for the message.

A board descriptor table 711 is used to maintain all of the pertinent information needed for message delivery to each remote computer board. The board descriptor table 711 includes an entry for each remote computer board and is indexed by processor number. The board descriptor table 711 is composed of information copied from each remote computer board hardware descriptor. Information in the board descriptor table 711 includes how to interrupt the remote computer board, what the computer board address is (in both the processor's address space and on the VMEbus), and the computer board type.

The send task 701 thus consults the send MT table 709 to determine which computer boards are to receive a message. The send task 701 also obtains a board descriptor for each remote computer board that is to receive a message. With this information (as well as some additional information), the send task 701 can program an onboard DMA controller 713 to transfer the message across a bus 715. Note that if multiple virtual input queues 707 on a remote computer board have registered for the same message, only one transfer across the bus is necessary.

The DMA transfer is made into an empty memory buffer 717. The message buffer 717 is pointed to by the descriptor ring 705, specifically the buf_ptr of the next descriptor in the descriptor ring 705 on the receiving computer board. In addition, an in_use flag is set for the descriptor ring 705. The sending process knows the message buffer on the receiving computer board is available because it had previously determined that the in_use field for that descriptor ring 705 was not set.

Once the DMA transfer is completed, the receiver is notified via an interrupt. Within an interrupt handler, the receiver indexes into a receive MT table 719, based on the message type, and obtains a list of local virtual input queues 707 that have registered for the message. The local virtual input queue may also be referred to as an application input queue. For each virtual input queue 707, a buffer pointer of the queue entry pointed at by a next to write pointer is modified to point to the message buffer 717, the next to write pointer is modified, and the reference count field in the message buffer 717 is incremented by one. Finally, the in use field of the virtual queue 707 entry is set, the buffer pointer of the descriptor ring 705 is set to point to a new message buffer 717 (obtained from a global free list), and the in use field of the descriptor ring 705 entry is cleared.

Later, when an application de-queues a message, the in use field of the virtual queue 707 entry is cleared, the virtual queue 707 next to read pointer is modified, and the reference count field of the message buffer 717 is decremented. Because multiple tasks might be de-queuing the same message buffer 717, updating of the reference count is protected, e.g., by task or interrupt locking. When the reference count goes to zero, the message buffer 717 is placed on the global free list.

Figure 8:
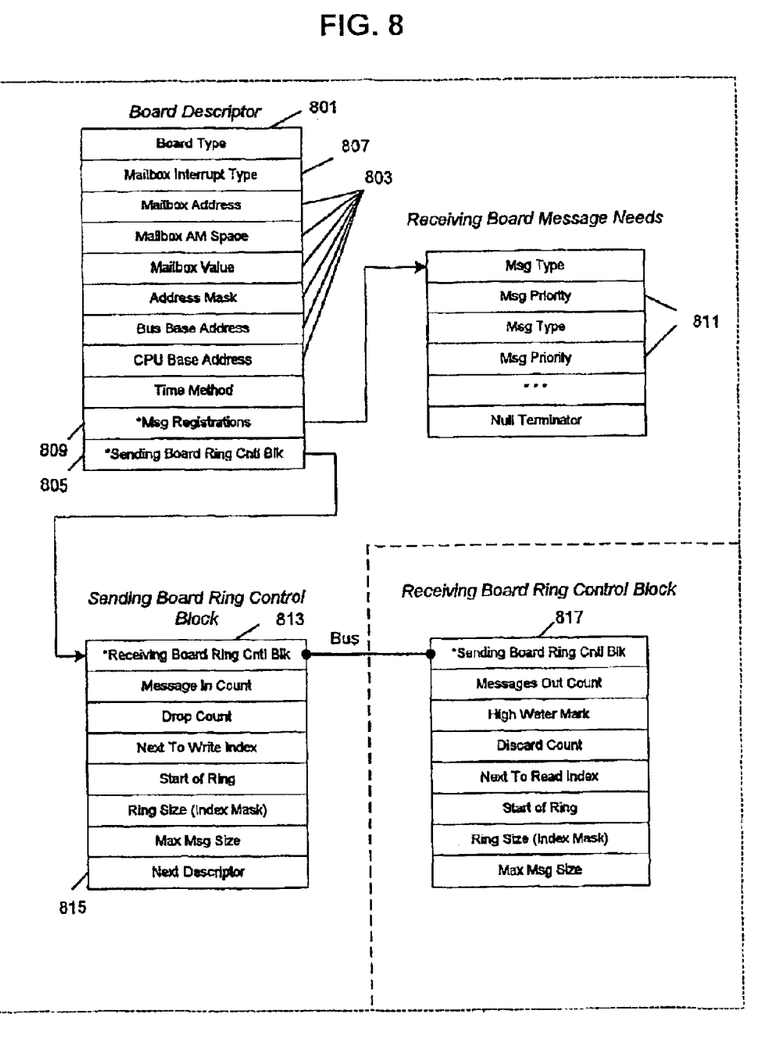
FIG. 8 illustrates examples of data structures used by the messaging scheme of the present invention.

FIG. 8 illustrates examples of data structures used by the messaging scheme of the present invention. A board descriptor 801 can be thought of as the handle to all of the information with respect to a remote computer board that is used by the sending computer board in order to deliver a message to a remote computer board. The board descriptor 801 includes information on the addressing 803 of the remote computer board, a pointer 805 to the sending computer board ring control block, information on the mailbox interrupt 807 to be used upon delivery of a message, and a pointer 809 to a list of all the messages that have been registered for on this computer board, along with their priorities 811.

The sending computer board ring control block structure 813 contains all the information about the remote descriptor ring that is needed for message transfers. Note that the next descriptor field 815 includes a copy of the next descriptor on the remote computer board, as it was copied at the end of the previous DMA chain transfer operation. For efficiency, the next descriptor (containing a pointer to the next dynamically allocated buffer) is copied during the DMA chain operation, since the in_use flag is most likely not set, which indicates that the buffer pointer (buf_ptr) is valid.

The receiving computer board descriptor ring control block 817 on the remote computer board, includes information about the receive descriptor ring(s) uniquely associated with the sending computer board. Also, the sending 813 and receiving 817 ring control block structures include fields to monitor ring overflow conditions (dropped messages) and the high water mark for messages in the ring.

Figure 9:
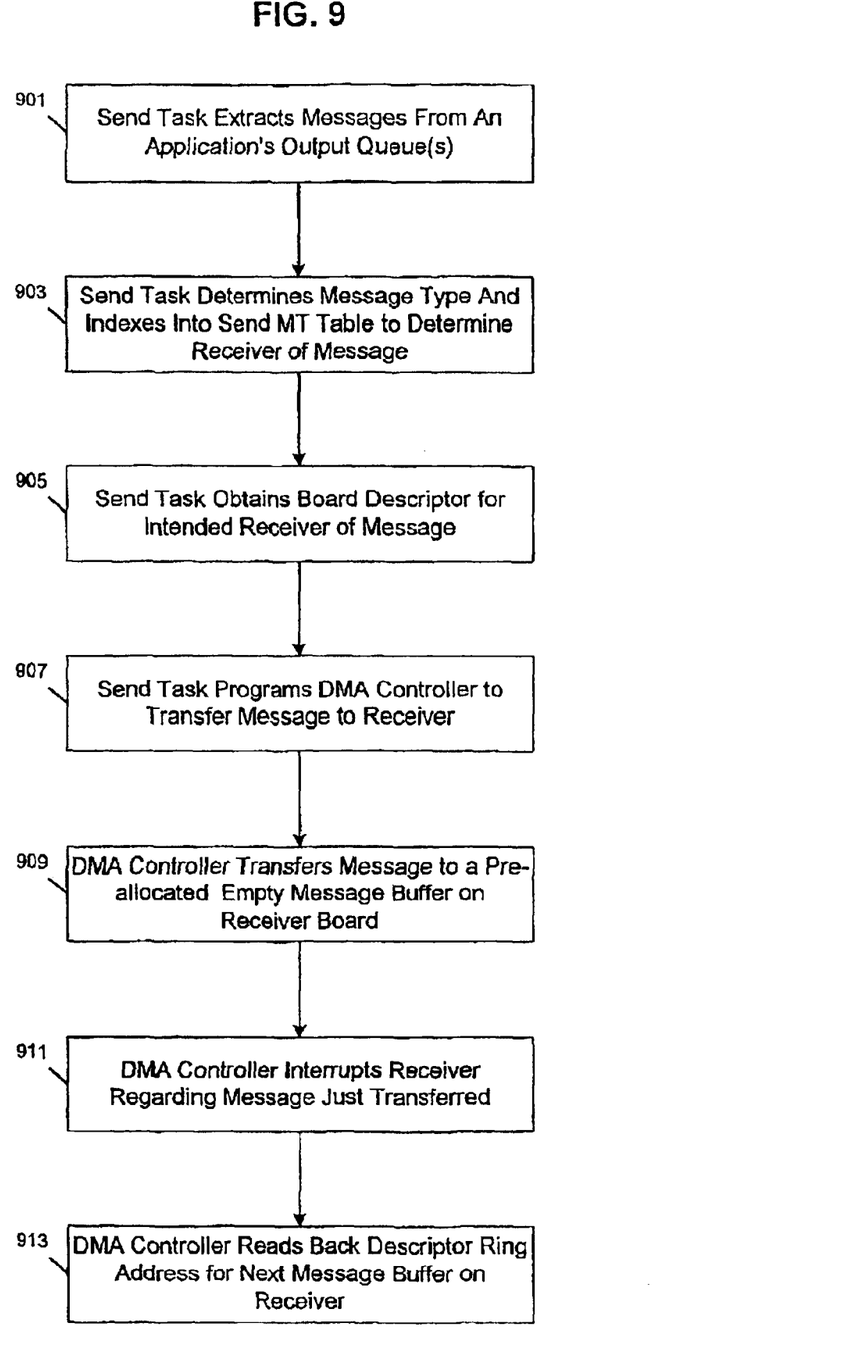
FIG. 9 is a detailed flow diagram for the sending process.

FIG. 9 illustrates the logic flow of the sending process on a given computer board. The computer board's send task extracts messages from an application's output queue or queues 901. The send task determines the message type and then indexes into the send MT table 903 that it created during the initialization process to determine which computer board is to receive the message. The send task obtains a board descriptor of the computer board that is to receive the message 905. The send task then programs the DMA controller to transfer the message 907 to the receiving computer board across the bus. The DMA transfer is sent to a pre-allocated empty message buffer on the receiving computer board 909. Recall, that message buffers were pre-allocated on all computer boards during the initialization and registration process.

Once the transfer is complete, the sending DMA controller sends a mailbox interrupt 911 to the receiving computer board to initiate the receive process on the receiving computer board. Lastly, the DMA controller reads back the address of the next message buffer according to the receiving computer board descriptor ring 913.

The DMA controller chains together message transfers across the bus in order to expedite the message sending process when multiple destinations are involved. With respect to the present invention, there are multiple elements in a DMA chain executed by the DMA controller for each destination. One element writes the body and in_use bit of message k to a queue on the remote computer board. Another element writes to the remote computer board mailbox interrupt location. Typically, the last element calls for reading the in_use bit of message k+1. At the end of the chain, after the VMEbus has been released, the sending DMA controller interrupts the local CPU. The local CPU then sets up the sending DMA controller for the next transfer while another computer board is free to use the backplane/bus. This scheme calls for one CPU interrupt per out-going message to ensure that the local computer board CPU does not have to poll the DMA controller waiting for a transfer complete status from the DMA controller. The overhead associated with the one CPU interrupt per out-going message may be reduced by having the CPU set up for all pending outgoing messages each time it is interrupted by the DMA controller with a transfer complete status. The multiple out-going messages would simply be added in to the DMA controller chain. This is most practical when multiple messages are targeted at different receiver queues.

Figure 10:
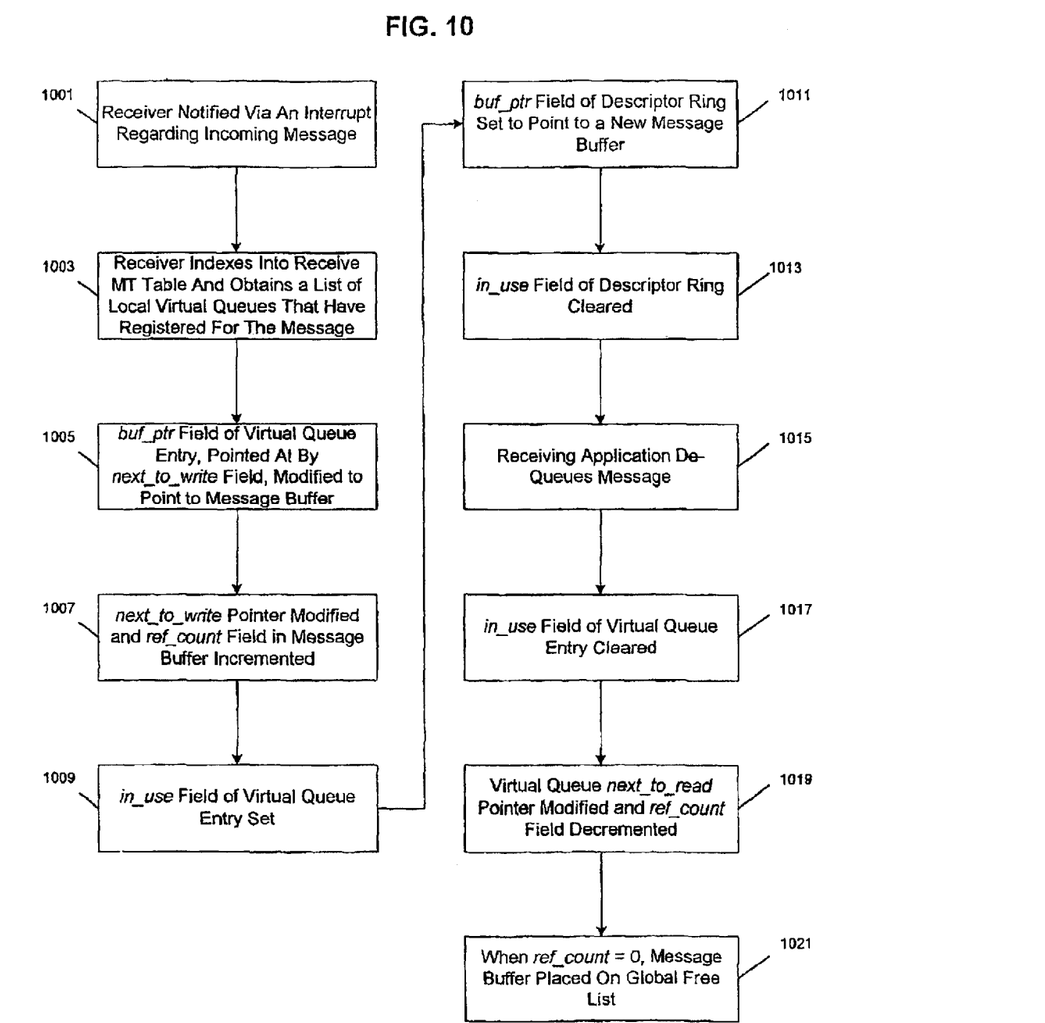
FIG. 10 is a detailed flow diagram for the receiving process.

FIG. 10 illustrates the logic flow of the receiving process on a given computer board. Following the initialization process, each computer board is ready for communications. As the last part of the DMA chain, the receiver is notified of the message receipt via a mailbox interrupt 1001. The receiver then indexes, based on message type, into its receive MT table and obtains a list of local virtual queues that have registered to receive the message 1003. The buffer pointer field within the virtual queue that is pointed to by the next to write field is modified to point to the message buffer containing the message at issue 1005. The virtual queue next to write pointer is then modified and the ref count field in the message buffer is incremented 1007 and the in_use flag of the virtual queue is set 1009. At this point, the buffer pointer field of the descriptor ring is set to point to a new message buffer 1011 and the in_use flag of the descriptor ring is cleared 1013.

The receiving application on the receiving computer board de-queues the just queued message on the virtual queue 1015. After de-queuing, the in_use flag of the virtual queue is cleared 1017 and the virtual queue next to read pointer is modified and the ref count field of the message buffer is decremented 1019. When the ref count value of the message buffer decrements back to zero, a message buffer is placed on the global free list 1021.

There are several advantages realized by the present invention. Foremost is the decoupling of communications between multiple senders accessing a common receiver. Using pre-allocated buffers eliminates many message buffer management issues associated with transferring data among processors on a bus. DMA (Direct Memory Access) hardware is used for all bus transfers ensuring that the processors never block while waiting for bus access. Thus, the CPU is not responsible for performing transfers. Multiple point to point connections can be simultaneously active between multiple processors, and mutual exclusion capabilities such as Test-And-Set are not needed. Moreover, all message transfers are done with write commands, which are significantly more efficient than reading across a bus.

It is to be understood that the present invention illustrated herein is readily implementable by those of ordinary skill in the art as a computer program product having a medium with a computer program embodied thereon. The computer program product is capable of being loaded and executed on the appropriate computer processing device(s) in order to carry out the method or process steps described. Appropriate computer program code in combination with hardware implements many of the elements of the present invention. This computer code is often stored on storage media. This media can be a diskette, hard disk, CD-ROM, optical storage media, or tape. The media can also be a memory storage device or collection of memory storage devices such as read-only memory (ROM) or random access memory (RAM). Additionally, the computer program code can be transferred to the appropriate hardware over some type of data network.

The present invention has been described, in part, with reference to flowchart or logic flow diagrams. It will be understood that each block of the flowchart diagrams or logic flow diagrams, and combinations of blocks in the flowchart diagrams or logic flow diagrams, can be implemented by computer program instructions.

These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks or logic flow diagrams.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart blocks or logic flow diagrams. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart blocks or logic flow diagrams.

Accordingly, block(s) of flowchart diagrams and/or logic flow diagrams support combinations of means for performing the specified functions, combinations of steps for performing the specified functions and program instruction means for performing the specified functions. It will also be understood that each block of flowchart diagrams and/or logic flow diagrams, and combinations of blocks in flowchart diagrams and/or logic flow diagrams can be implemented by special purpose hardware-based computer systems that perform the specified functions or steps, or combinations of special purpose hardware and computer instructions.

In the following claims, any means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A method of backplane messaging among a plurality of computer boards connected via a bus, each computer board including a processor and a DMA controller and each computer board capable of sending and receiving messages, said method comprising:

initializing said plurality of computer boards, said initialization for the purpose of preparing each computer board to communicate with the other computer boards;

sending messages, utilizing the DMA controller included on the computer board and not the processor of the computer board, from any one of the plurality of computer boards to any other of the plurality of computer boards; and receiving messages on any one of the plurality of computer boards sent from any other of the plurality of computer boards, said messages received into pre-allocated message buffers on said computer boards, said pre-allocated message buffers pointed to by a descriptor ring, wherein de-coupling of communications between multiple sending computer boards attempting to access a common receiving computer board is achieved.

2. The method of claim 1 wherein said sending step for a computer board comprises:

determining the message type of a message to be sent to a receiving computer board;

indexing into a send table to determine the identity of the receiving computer board;

obtaining board descriptor data for the receiving computer board;

having the DMA controller and not the processor transfer the message to a pre-allocated buffer on the receiving computer board;

having the DMA controller read back a descriptor ring address for the next message buffer on the receiving computer board; and having the DMA controller interrupt the receiver on the receiving computer board in order to notify the receiving computer board that a message has been placed into a message buffer on the receiving computer board.

3. The method of claim 2 wherein said send table is comprised of a bit array in which each bit corresponds to a processor number for each computer board.

4. The method of claim 2 wherein said board descriptor data for a computer board is comprised of information including an entry for the computer board, how to interrupt the computer board, the address of the computer board in its own processor space, the address of the computer board on the bus, and the type of the computer board.

5. The method of claim 2 wherein said having the DMA controller transfer the message to a pre-allocated buffer on the receiving computer board is achieved via DMA chaining.

6. The method of claim 5 wherein said having the DMA controller transfer the message to a pre-allocated buffer on the receiving computer board is achieved via DMA chaining utilizing write commands only.

7. The method of claim 1 wherein said receiving step for a computer board comprises:

searching the descriptor ring for a full message buffer containing a received message, said descriptor ring corresponding to a sending computer board;

indexing into a receive table to obtain a list of virtual queues that have registered for the received message;

relaying the received message, via pointer manipulation, from the message buffer to the virtual queues that have registered for the received message; and replenishing the descriptor ring with an empty message buffer.

8. The method of claim 7 wherein a plurality of descriptor rings corresponding to the other computer boards are implemented on a computer board.

9. A system for backplane messaging among a plurality of computer boards connected via a bus, each computer board including a processor and a DMA controller and each computer board capable of sending and receiving messages, said system comprising:

means for initializing said plurality of computer boards, said initialization for the purpose of preparing each computer board to communicate with the other computer boards;

means for sending messages, utilizing the DMA controller included on the computer board and not the processor of the computer board, from any one of the plurality of computer boards to any other of the plurality of computer boards; and means for receiving messages on any one of the plurality of computer boards sent from any other of the plurality of computer boards, said messages received into pre-allocated message buffers on said computer boards, said pre-allocated message buffers pointed to by a descriptor ring, wherein de-coupling of communications between multiple sending computer boards attempting to access a common receiving computer board is achieved.

10. The system of claim 9 wherein said means for sending comprises:

means for determining the message type of a message to be sent to a receiving computer board;

means for indexing into a send table to determine the identity of the receiving computer board;

means for obtaining board descriptor data for the receiving computer board;

means for having the DMA controller and not the processor transfer the message to a pre-allocated buffer on the receiving computer board;

means for having the DMA controller read back a descriptor ring address for the next message buffer on the receiving computer board; and means for having the DMA controller interrupt the receiver on the receiving computer board in order to notify the receiving computer board that a message has been placed into a message buffer on the receiving computer board.

11. The system of claim 10 wherein said send table is comprised of a bit array in which each bit corresponds to a processor number for each computer board.

12. The system of claim 10 wherein said board descriptor data for a computer board is comprised of information including an entry for the computer board, how to interrupt the computer board, the address of the computer board in its own processor space, the address of the computer board on the bus, and the type of the computer board.

13. The system of claim 10 wherein said means for having the DMA controller transfer the message to a pre-allocated buffer on the receiving computer board is achieved via DMA chaining.

14. The system of claim 13 wherein said means for having the DMA controller transfer the message to a pre-allocated buffer on the receiving computer board is achieved via DMA chaining utilizing write commands only.

15. The system of claim 9 wherein said means for receiving comprises:

means for searching the descriptor ring for a full message buffer containing a received message, said descriptor ring corresponding to a sending computer board;

means for indexing into a receive table to obtain a list of virtual queues that have registered for the received message;

means for relaying the received message, via pointer manipulation, from the message buffer to the virtual queues that have registered for the received message; and means for replenishing the descriptor ring with an empty message buffer.

16. The system of claim 15 wherein a plurality of descriptor rings corresponding to the other computer boards are implemented on a computer board.

17. A computer program product for backplane messaging among a plurality of computer boards connected via a bus, each computer board including a processor and a DMA controller and each computer board capable of sending and receiving messages, the computer program product having a medium with a computer program embodied thereon, the computer program product comprising:

computer program code for initializing said plurality of computer boards, said initialization for the purpose of preparing each computer board to communicate with the other computer boards;

computer program code for sending messages, utilizing the DMA controller included on the computer board and not the processor of the computer board, from any one of the plurality of computer boards to any other of the plurality of computer boards; and computer program code for receiving messages on any one of the plurality of computer boards sent from any other of the plurality of computer boards, said messages received into pre-allocated message buffers on said computer boards, said pre-allocated message buffers pointed to by a descriptor ring, wherein de-coupling of communications between multiple sending computer boards attempting to access a common receiving computer board is achieved.

18. The computer program product of claim 17 wherein said computer program code for sending comprises:

computer program code for determining the message type of a message to be sent to a receiving computer board;

computer program code for indexing into a send table to determine the identity of the receiving computer board;, computer program code for obtaining board descriptor data for the receiving computer board;

computer program code for having the DMA controller and not the processor transfer the message to a pre-allocated buffer on the receiving computer board;

computer program code for having the DMA controller read back a descriptor ring address for the next message buffer on the receiving computer board; and computer program code for having the DMA controller interrupt the receiver on the receiving computer board in order to notify the receiving computer board that a message has been placed into a message buffer on the receiving computer board.

19. The computer program product of claim 18 wherein said send table is comprised of a bit array in which each bit corresponds to a processor number for each computer board.

20. The computer program product of claim 18 wherein said board descriptor data for a computer board is comprised of information including an entry for the computer board, how to interrupt the computer board, the address of the computer board in its own processor space, the address of the computer board on the bus, and the type of the computer board.

21. The computer program product of claim 18 wherein said computer program code for having the DMA controller transfer the message to a pre-allocated buffer on the receiving computer board is achieved via DMA chaining.

22. The computer program product of claim 21 wherein said computer program code for having the DMA controller transfer the message to a pre-allocated buffer on the receiving computer board is achieved via DMA chaining utilizing write commands only.

23. The computer program product of claim 17 wherein said computer program code for receiving comprises:

computer program code for searching the descriptor ring for a full message buffer containing a received message, said descriptor ring corresponding to a sending computer board;

computer program code for indexing into a receive table to obtain a list of virtual queues that have registered for the received message;

computer program code for relaying the received message, via pointer manipulation, from the message buffer to the virtual queues that have registered for the received message; and computer program code for replenishing the descriptor ring with an empty message buffer.

24. The computer program product of claim 23 wherein a plurality of descriptor rings corresponding to the other computer boards are implemented on a computer board.

* * * * *